S. H. LORNIG.
HOSE COUPLING.
No. 65,758.
Patented June 11, 1867.
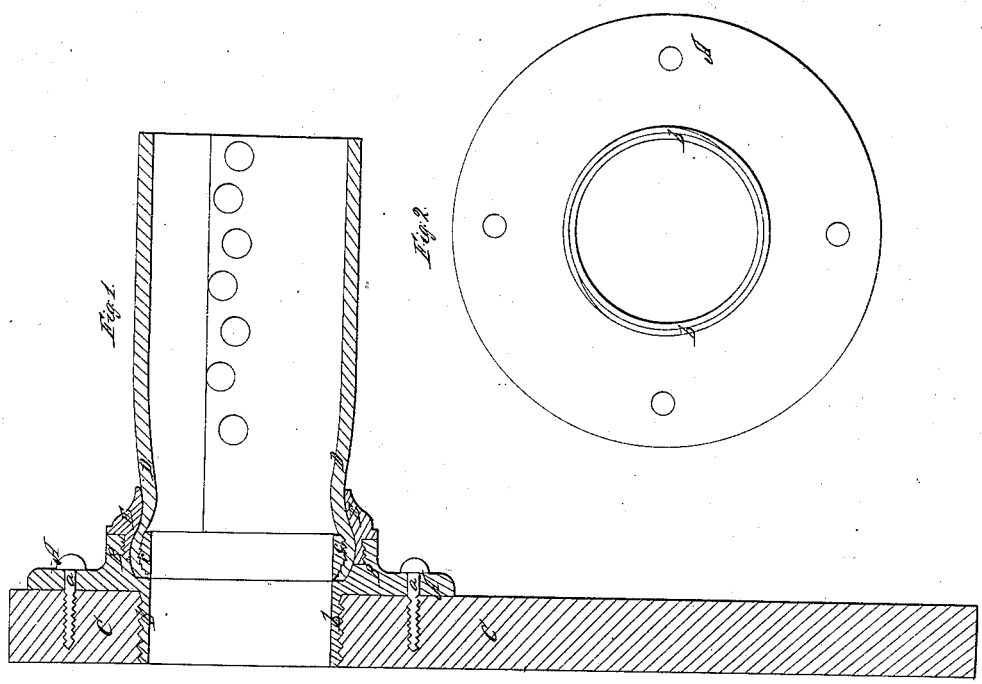
Witnesses:
Inventor:
Silas H Loring

United States Patent Office

SILAS H. LORING, OF LAWRENCE, MASSACHUSETTS.

Letters Patent No. 65,758, dated June 11, 1867.

IMPROVEMENT IN HOSE-COUPLINGS.

The Schedule referred to in these Letters Patent and making part of the same.

TO ALL WHOM IT MAY CONCERN:

Be it known that I, SILAS H. LORING, of Lawrence, in the county of Essex, and State of Massachusetts, have invented a new and useful Improvement in the Hose Attachments which are used for connecting or attaching hose to tanks, cisterns, or other fluid-receivers, of which the following is a full, clear, and exact description, reference being had to the accompanying drawings, making part of this specification, in which—

Figure 1 is a longitudinal central section of a portion of an ordinary hose attached to the side of a tank or cistern by means of my improved hose attachment.

Figure 2 is an end view.

The object of this invention is to provide an easy, safe, and convenient means of attaching hose to tanks and cisterns, or where fluid is drawn from one tank to another, or to convey fluids from tanks, cisterns, or vats to drains or to movable casks for transportation, and when permanently attached to a tank or cistern, said attachment may have a projecting flange, A, formed on or cast in one with the annular portion B or flange socket, which fits against the outer surface of the side C of the tank, and may be fastened thereto by screws or by bolts, or the end $b$ may extend beyond the flange A, and have a coarse screw on the outside of it to screw into a hole made into the side C of the tank or cistern, and when thus arranged the flange A may be dispensed with and the portion B of the attachment may be easily removed from one tank or cistern and applied to another. One end of the hose D is pushed through the annular portion E of the attachment, the inner surface of which is curved or flaring, and largest at the end V. A ring, $c$, having a straight inner surface, and an oval exterior with annul V-shaped grooves and sharp projections to indent the leather or other material of which the hose are made, is placed within the end of the hose, so that when the annular clamping-ring or portion E of the attachment is drawn outwards towards the end of the hose and screwed into the portion B of the attachment, the leather or other substance is pressed into the sharp projections on the ring $c$, and held so firmly between the said ring and the portions B and E as to prevent leakage or the possibility of the hose being drawn from the attachment by the action of fluid passing through the hose, be the pressure ever so great.

When several tanks are used, and fluids drawn from one to another, or where fluids are drawn from several tanks into casks, a single piece of hose may serve for all by having a flange-socket, B, fitted to each tank, and one clamping-ring E and inner ring $c$ fitted to the end of the hose. The hose can thus be disconnected from one tank and connected to or attached to another in a few seconds.

By the use of my improvement all the strength of the attached end of the hose is retained, and the greater the pressure by the action of fluids upon the hose the tighter the attachment will hold, thereby preventing leakage. It is also connected and disconnected much easier and quicker than any other hose attachment.

My improved hose attachment may be applied to hose of rubber or cloth as well as to leather, or any other material of which hose are made, and is equally serviceable on them all.

I claim the ring C within the end of the hose D, in combination with the annular clamping-ring E and flange-socket B, the flange A or projecting end $b$, all arranged substantially as and for the purpose set forth.

SILAS H. LORING.

Witnesses:
JOHN E. CRANE,
J. B. SAMUELS.